(12) United States Patent
Shi et al.

(10) Patent No.: US 9,548,069 B2
(45) Date of Patent: Jan. 17, 2017

(54) METHOD FOR PRODUCING A SMOOTH RU SIDE GAP OF A DAMASCENE WRITER POLE

(71) Applicant: HGST Netherlands B.V., Amsterdam (NL)

(72) Inventors: Ning Shi, San Jose, CA (US); Xiaoyu Xu, San Jose, CA (US); Sue S. Zhang, Saratoga, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 588 days.

(21) Appl. No.: 13/830,144

(22) Filed: Mar. 14, 2013

(65) Prior Publication Data

US 2014/0272120 A1   Sep. 18, 2014

(51) Int. Cl.
*G11B 21/00* (2006.01)
*G11B 5/23* (2006.01)
*G11B 5/127* (2006.01)
*G11B 5/31* (2006.01)

(52) U.S. Cl.
CPC ............. *G11B 5/232* (2013.01); *G11B 5/1278* (2013.01); *G11B 5/3116* (2013.01); *G11B 5/3163* (2013.01)

(58) Field of Classification Search
CPC ........... G11B 5/87; G11B 5/295; G11B 5/746; G11B 5/743; G11B 21/00; G11B 5/8404
USPC ..... 360/324.2, 328; 427/127, 128, 129, 130, 427/131, 132; 428/800
See application file for complete search history.

(56) References Cited

U.S. PATENT DOCUMENTS

| | | | |
|---|---|---|---|
| 6,877,213 B2 | 4/2005 | Zolla | |
| 6,949,833 B2 | 9/2005 | O'Kane et al. | |
| 6,972,928 B2 | 12/2005 | Snyder et al. | |
| 8,056,213 B2 | 11/2011 | Han et al. | |
| 8,108,986 B2 | 2/2012 | Liu | |
| 8,110,085 B2 | 2/2012 | Hsiao et al. | |
| 8,189,295 B2 | 5/2012 | Han et al. | |
| 8,262,918 B1 | 9/2012 | Li et al. | |
| 2002/0057538 A1* | 5/2002 | Trindade ................ B82Y 10/00 |
| | | | 360/319 |
| 2009/0091862 A1* | 4/2009 | Han et al. ................. 360/319 |
| 2009/0162699 A1* | 6/2009 | Sasaki et al. ............. 428/812 |
| 2010/0328817 A1 | 12/2010 | Kief et al. | |
| 2011/0151279 A1* | 6/2011 | Allen et al. ............... 428/815 |
| 2011/0250464 A1* | 10/2011 | Wilson et al. ............ 428/570 |
| 2012/0125886 A1* | 5/2012 | Hong et al. ............... 216/22 |
| 2012/0181181 A1* | 7/2012 | Cheng et al. ............. 205/122 |

OTHER PUBLICATIONS

Yang et al. "Electron Beam Lithography Method for Sub-50 mm Isolated Trench wth High Aspect Ratio"; Proceedings of the SPIE, 2003, vol. 5037, pp. 168-177.

* cited by examiner

*Primary Examiner* — Tabassom Tadayyon Eslami
(74) *Attorney, Agent, or Firm* — Patterson & Sheridan, LLP

(57) ABSTRACT

The present invention generally relates to a method for forming a smooth gap of a damascene write pole. An opening having a side wall with a first angle with respect to vertical is formed in a fill layer, and a first non-magnetic layer is deposited into the opening by ion beam deposition. The ion beam is delivered to the side wall at a second angle with respect to vertical. The ratio of the first angle to the second angle ranges from about 250 to about 3.5.

8 Claims, 5 Drawing Sheets

METHOD FOR PRODUCING A SMOOTH RU SIDE GAP OF A DAMASCENE WRITER POLE

BACKGROUND OF THE INVENTION

Field of the Invention

Embodiments of the present invention generally relate to methods of making side gap layers of a damascene write pole.

Description of the Related Art

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

In order to meet the ever increasing demand for improved data rate and data capacity, researchers have developed perpendicular recording systems, which record data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, passing back through the magnetically hard top layer and returning to the return pole where the magnetic flux is spread out and too weak to erase the signal recorded by the write pole.

At the ABS, the write pole is surrounded by side gap layers. The side gap layers prevent the write pole from writing to adjacent data tracks and magnetic write field from leaking out. Sometimes the side gap layers have a bumpy surface adjacent to the write pole, causing the bevel angle measurement to be very difficult. The bumpy surface of the side gap layers may also impact magnetic properties of films subsequently grown thereon.

Therefore, there is a need in the art for an improved method for forming the side gap layers.

SUMMARY OF THE INVENTION

The present invention generally relates to a method for forming a smooth gap of a damascene write pole. An opening having a side wall with a first angle with respect to vertical to the wafer is formed in a fill layer, and a first non-magnetic layer is deposited into the opening by ion beam deposition. The ion beam is delivered to the side wall at a second angle with respect to vertical to the wafer, and the wafer may be rotating about wafer's vertical axis during deposition. When the first angle is relatively large (greater than 18 degree and smaller than 30 degrees), the second angle may be small and continuously ranging from about 0 to about 7 degrees during the substantial portion of the entire deposition process. It is to be understood that wafer movement during deposition may be significantly different from one ion beam system to another, and the second angle defined herein is instantaneous. Therefore, a brief deviation from the second angle illustrated herein may yield the same results.

In one embodiment, a method for forming a magnetic write head is disclosed. The method includes depositing a first layer over a substrate, depositing a fill layer over the first layer, and forming an opening in the fill layer. The opening includes a side wall having a first angle with respect to vertical. The method further includes depositing a first non-magnetic layer into the opening in the fill layer using ion beam deposition, and the ion beam deposition includes delivering an ion beam at the side wall at a second angle with respect to vertical. When the first angle is large (greater than 18 degrees and smaller than 30 degrees), the second angle may be as small as technically feasible (continuously ranging from 0 to 7 degrees) during substantial portion of the entire deposition process. The method further includes depositing a second non-magnetic layer on the first non-magnetic layer.

In another embodiment, a method for forming a magnetic write head is disclosed. The method includes depositing a first layer of material that is resistant to reactive ion etching over a substrate, depositing a fill layer over the first layer, and forming an opening in the fill layer. The opening comprises a side wall having a first angle with respect to vertical. The method further includes depositing a seed layer into the opening in the fill layer using ion beam deposition, and the ion beam deposition includes delivering an ion beam at the side wall at a second angle with respect to vertical. When the first angle is large (greater than 18 degrees and smaller than 30 degrees), the second angle may be as small as technically feasible (continuously ranging from 0 to 7 degrees) during substantial portion of the deposition process. The method further includes partially epitaxial growing a non-magnetic layer on the seed layer using atomic layer chemical vapor deposition.

In another embodiment, a method for forming a magnetic write head is disclosed. The method comprises depositing a first layer of material that is resistant to reactive ion etching over a substrate, depositing a fill layer over the first layer, depositing an RIE mask layer over the fill layer, forming an opening in the RIE mask layer and the fill layer, depositing a first ruthenium seed layer into the opening in the fill layer and over the RIE mask layer, and depositing a second ruthenium layer on the first ruthenium layer. The first and the second ruthenium layers have a first total thickness along the side wall in the opening of the fill layer and a second total thickness over the RIE mask layer, and the first total thickness and the second total thickness are within ±5% of each other. The thickness of the first ruthenium seed layer is substantially less than the thickness of the second ruthenium layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a method for forming a smooth gap of a damascene write pole. An opening having a side wall with a first angle with respect to a vertical is formed in a fill layer, and a first non-magnetic layer is deposited into the opening by ion beam deposition. The ion beam is delivered to the side wall at a second angle with respect to vertical. When the first angle is large (between 18 and 30 degrees), the second angle may be continuously staying within 0 to 7 degrees during substantial portion of the entire deposition process.

Figure 1:
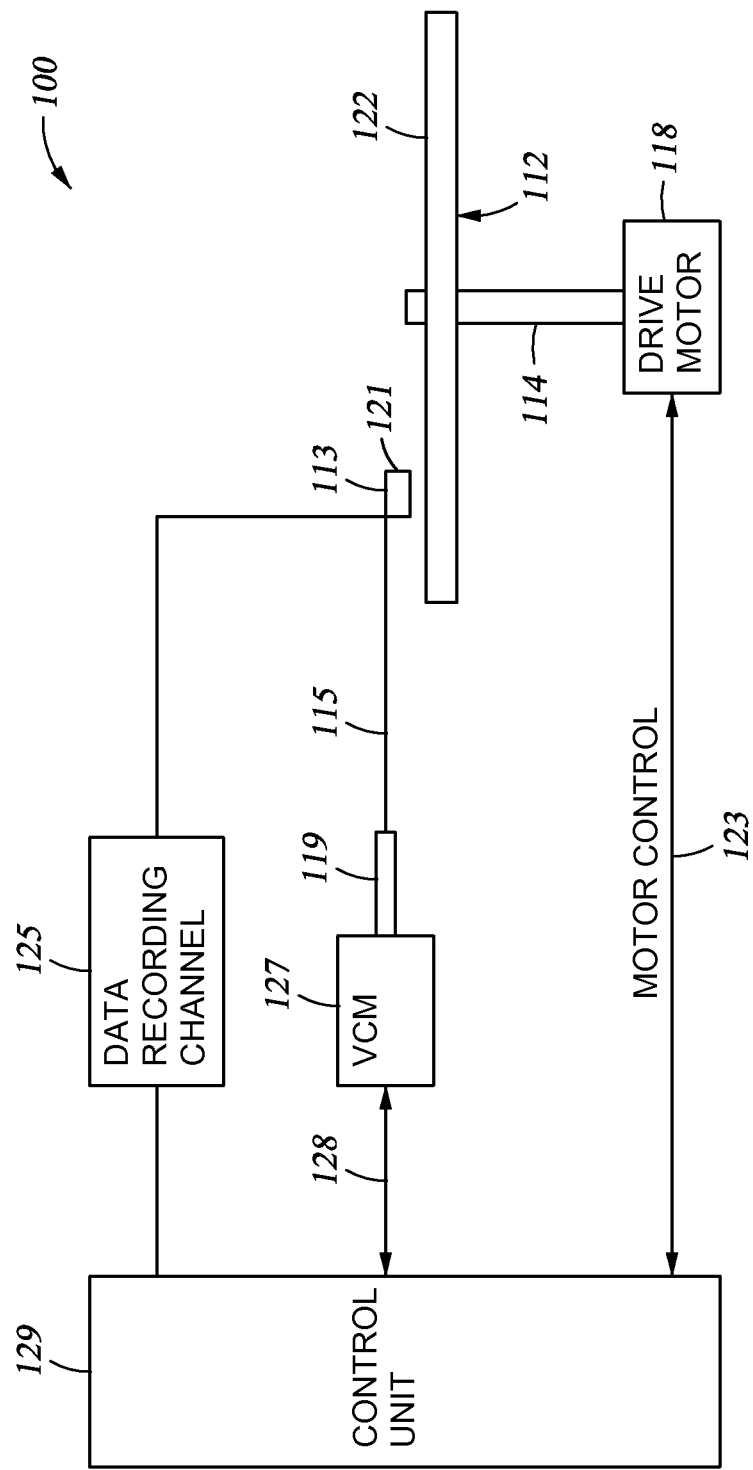
FIG. 1 illustrates a disk drive system, according to an embodiment of the invention.

FIG. 1 illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk 112 where desired data is written. Each slider 113 is attached to an actuator arm 119 by way of a suspension 115. The suspension 115 provides a slight spring force which biases the slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

During operation, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk 112 surface by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
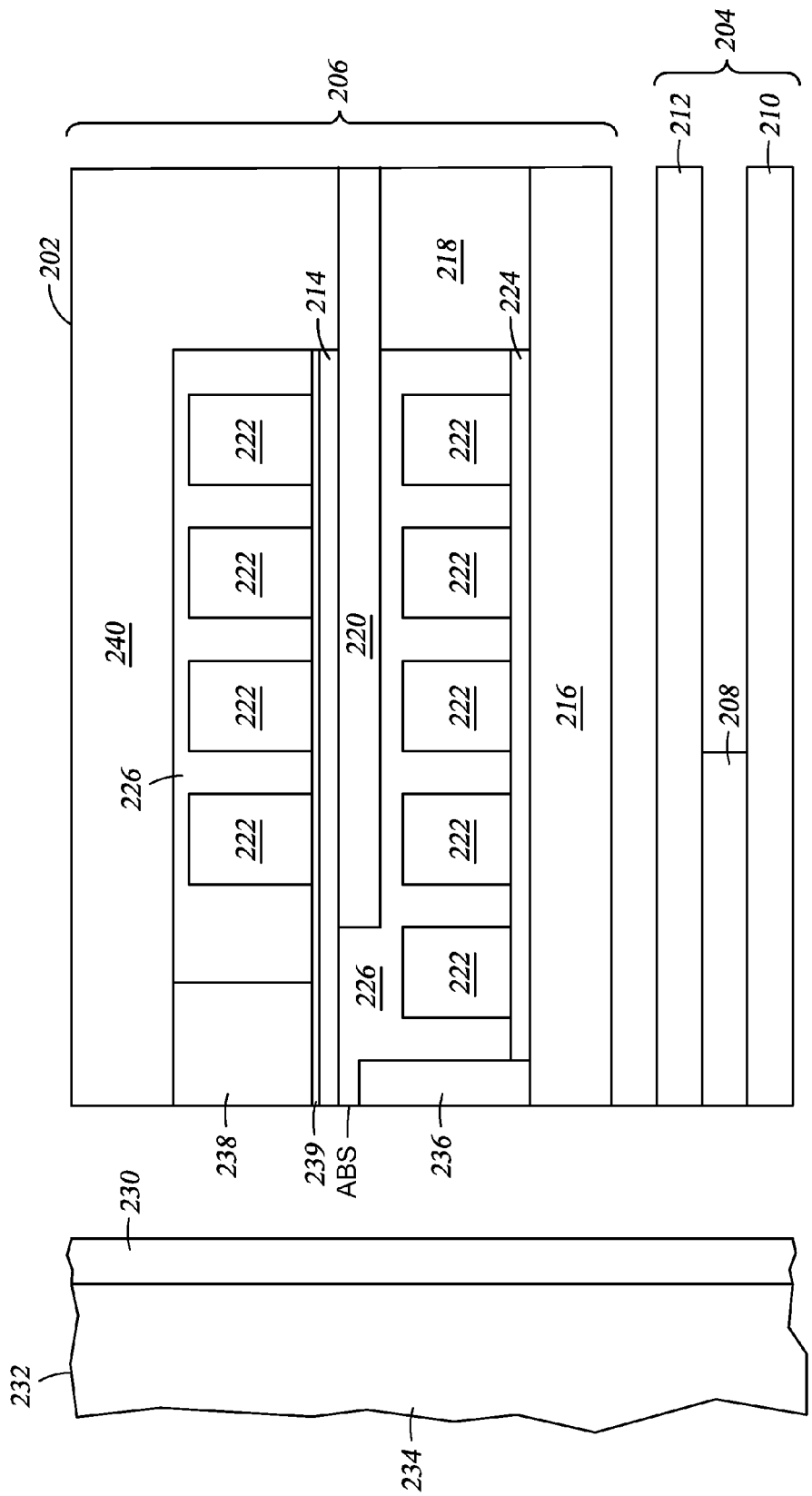
FIG. 2 illustrates a side view of a magnetic head according to one embodiment of the invention.

FIG. 2 illustrates a side view of a magnetic head 202 according to one embodiment of the invention. The magnetic head 202 includes a read head 204 and a write head 206. The read head 204 includes a magnetoresistive sensor 208, which can be a giant magnetoresistance (GMR), tunnel magnetoresistive (TMR), or some other type of sensor. The magnetoresistive sensor 208 is located between first and second magnetic shields 210, 212.

The write head 206 includes a magnetic write pole 214 and a magnetic return pole 216. The write pole 214 can be formed upon a magnetic shaping layer 220, and a magnetic back gap layer 218 magnetically connect the write pole 214 and the shaping layer 220 with the return pole 216 at a location removed from the ABS. A write coil 222 (shown in cross section in FIG. 2) passes between the write pole 214, the shaping layer 220, and the return pole 216, and may also pass above the write pole 214 and the shaping layer 220. The write coil 222 can be a helical coil or can be one or more pancake coils. The write coil 222 can be formed upon an insulation layer 224 and can be embedded in a coil insulation layer 226 such as alumina and or hard baked photoresist.

During operation, an electrical current flowing through the write coil 222 induces a magnetic field that causes a magnetic flux to flow through the return pole 216, back gap layer 218, shaping layer 220, and write pole 214. This causes a magnetic write field to be emitted from the tip of the write pole 214 toward a magnetic medium 232. The write pole 214 has a cross section at the ABS that is much smaller than the cross section of the return pole 216 at the ABS. Therefore, the magnetic field emitting from the write pole 214 is sufficiently dense and strong that the write pole 214 can write a data bit to a magnetically hard top layer 230 of the magnetic medium 232. The magnetic flux then flows through a magnetically soft underlayer 234, and returns back to the return pole 216, where the magnetic flux is sufficiently spread out and too weak to erase the data bit recorded by the write pole 214. A magnetic pedestal 236 may be provided at the ABS and attached to the return pole 216 to prevent stray magnetic fields from the write coil 222 from affecting the magnetic signal recorded to the magnetic medium 232.

In order to increase write field gradient, and therefore increase the speed with which the write head 206 can write data, a trailing, wrap-around magnetic shield 238 can be provided. The magnetic shield 238 is separated from the write pole 214 by a non-magnetic layer 239. The magnetic shield 238 attracts the magnetic field from the write pole 214, which slightly cants the angle of the magnetic field emitting from the write pole 214. This canting of the magnetic field increases the speed with which magnetic field polarity can be switched by increasing the field gradient. A trailing magnetic return pole 240 can be provided and can be magnetically connected with the magnetic shield 238. Therefore, the trailing return pole 240 can magnetically connect the magnetic shield 238 with the back portion of the write pole 214, such as with the back end of the shaping layer 220 and with the back gap layer 218. The magnetic shield 238 is also a second return pole so that in addition to magnetic flux being conducted through the medium 232 to the return pole 216, the magnetic flux also flows through the medium 232 to the trailing return pole 240.

Figure 3:
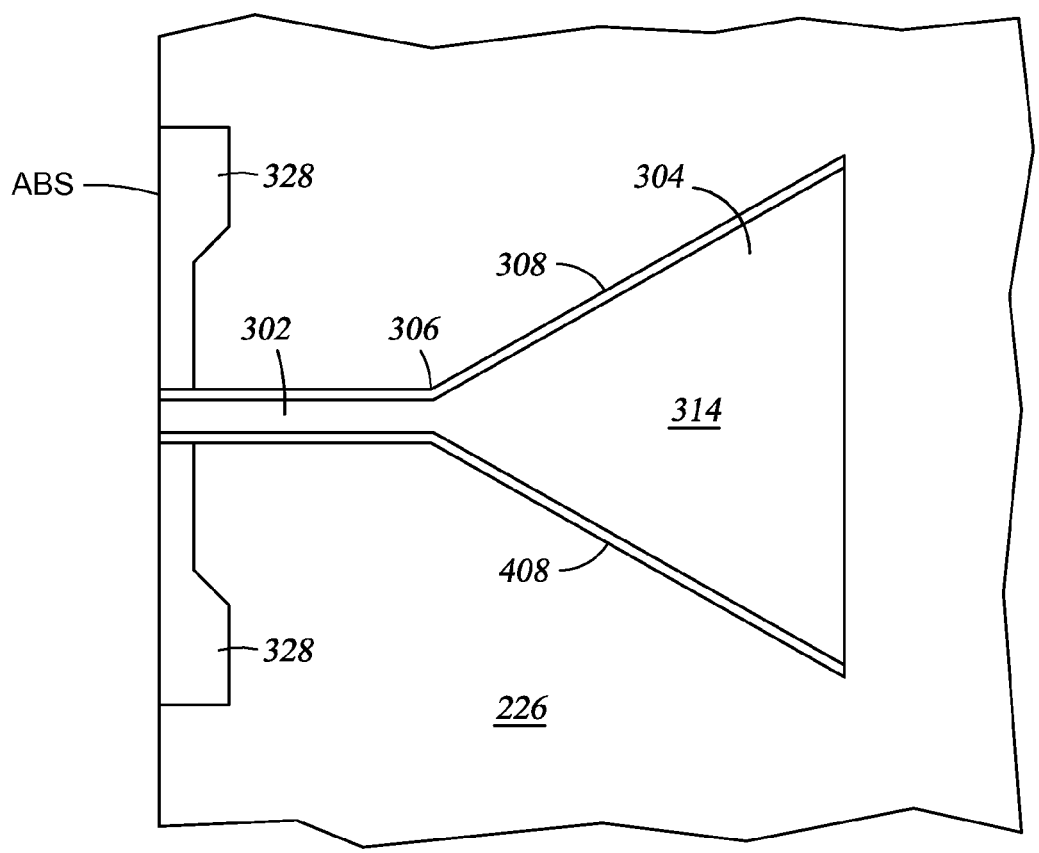
FIG. 3 illustrates a top view of a write pole of the magnetic head of FIG. 2 according to one embodiment of the invention.

FIG. 3 illustrates a top view of the write pole 214 of the magnetic head 206 according to one embodiment of the invention. The write pole 214 has a narrow pole tip portion 302 and a wider flared portion 304. The transition from the pole tip region 302 to the flared portion 304 defines a flare point 306. As can be seen, the magnetic shield 238 has side shield portions 328 that are separated from the write pole 314 by non-magnetic side gap layers 308.

Figure 4A:
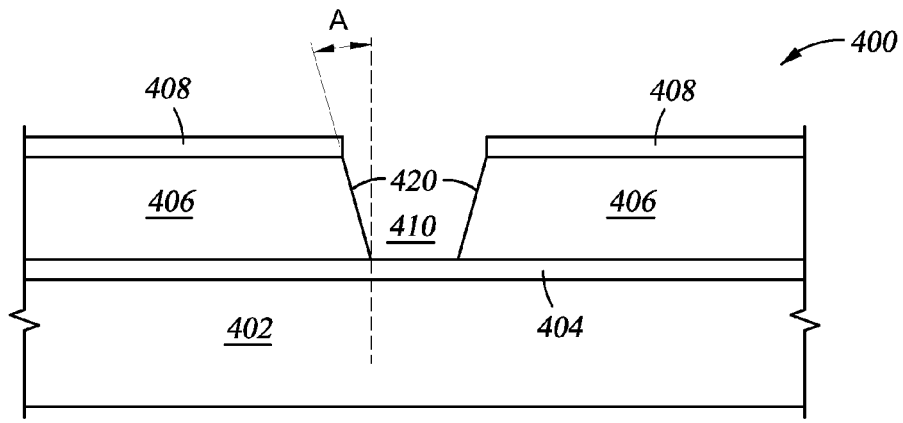
FIGS. 4A-4C are cross-sectional illustrations of magnetic heads during forming of the side gap layers according to various embodiments of the invention.
Figure 4B:
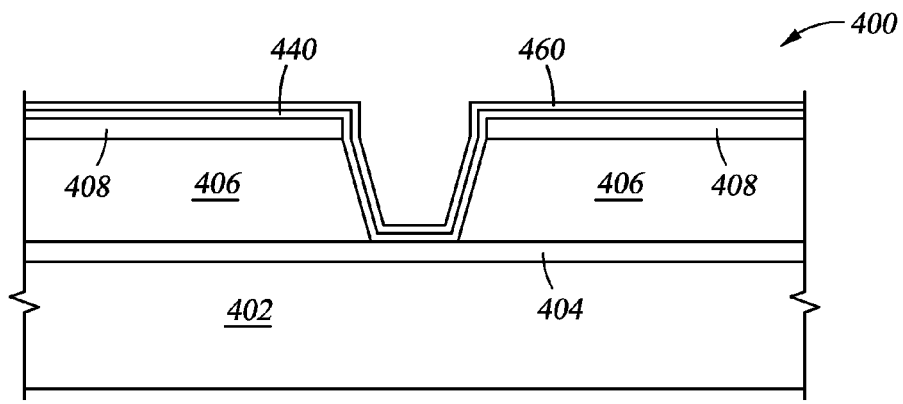
Figure 4C:
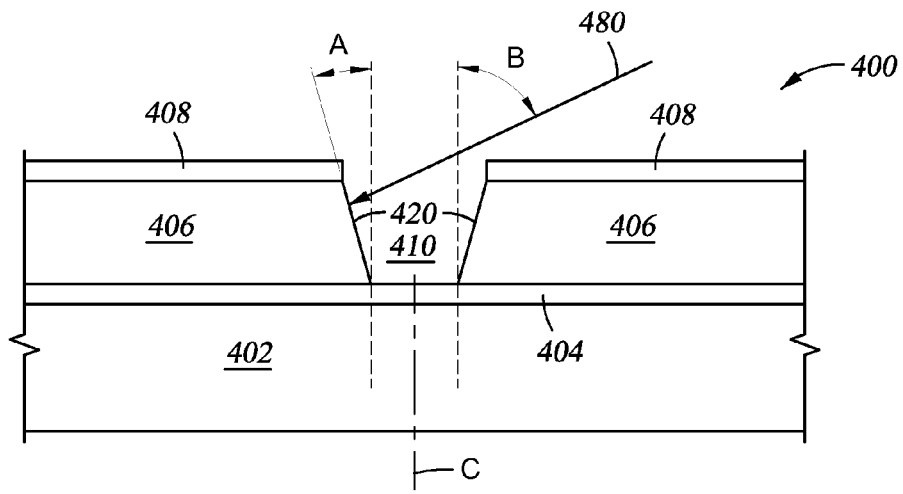

FIGS. 4A-4C illustrate methods for forming the side gap layers 308 according to various embodiments of the invention. As shown in FIG. 4A, a stack 400 includes a substrate 402, a reactive ion etching (RIE) stop layer 404, a fill layer 406, an RIE mask layer 408, and an opening 410 in the fill layer 406. The substrate 402 may include all or a portion of the shaping layer 220 and may also include a portion of the coil insulation layer 226 described above with reference to FIG. 2. The RIE stop layer 404 is deposited over the substrate 402 and is made with a material that is resistant to RIE with chlorine-based chemistry such as BCl$_3$, such as ruthenium (Ru), rhodium (Rh), nickel chromium (NiCr), chromium (Cr), or Nickel Iron (NiFe).

The fill layer 406 is deposited over the RIE stop layer 404 and is made with a material that is not resistant to RIE, such as silicon oxide (SiO$_2$) or alumina, where alumina is used for RIE with chlorine-based chemistry and SiO$_2$ is used for RIE with fluorine-based chemistry. The fill layer 406 is deposited with a sufficient thickness to form a write pole therein. Prior to forming the opening 410, the RIE mask layer 408 is deposited over the fill layer 406. The RIE mask layer 408 may include one or more of tantalum (Ta), Cr, NiCr, etc. The opening 410 may be formed in the RIE mask layer 408 and the fill layer 406 by one or more RIEs. In one embodiment, one of the RIEs uses chlorine based chemistry to form inward tapered side walls 420 on the fill layer 406. The opening 410 defines the shape of a write pole. In one embodiment, the opening 410 is formed with one or more ion milling processes which also resulting in forming inward tapered side walls 420.

The side walls 420 have an angle with respect to vertical, as indicated by "A" in FIG. 4A. The side walls 420 may have different angles with respect to vertical depending on various magnetic drive device performance requirements. In one embodiment, the side walls 420 have an angle that is at least 25 degrees with respect to vertical. Before the opening 410 is filled with a write pole, one or more side gap layers may be deposited in the opening 410 and over the RIE mask layer 408. In one embodiment, as shown in FIG. 4B, a first side gap layer 440 is formed in the opening and over the RIE mask layer 408, and a second side gap layer 460 is formed over the first side gap layer 440. Both side gap layers 440, 460 may be made of a non-magnetic material, such as Ru.

In one embodiment, the first side gap layer 440 may be deposited by ion beam deposition (IBD). During an IBD, as shown in FIG. 4C, an ion beam 480 is directed at the side walls 420 at an angle "B" with respect to vertical to deposit materials such as Ru over the side walls 420. As a result, the first side gap layer 440 is formed. The angled delivery of the ion beam 480 may be achieved by tilting the stack 400. In one embodiment, the stack 400 may rotate around an axis "C" for a more uniform deposition. Following the deposition of the first side gap layer 440, the second side gap layer 460 is deposited over the first side gap layer 440 by atomic layer chemical vapor deposition (ALCVD). In one embodiment, the second side gap layer 460 is made of a non-magnetic material, such as Ru. The surface of the second side gap layer 460 facing the opening 410 may be smooth and the microstructure of the second side gap layer 460 is consistent inside the opening 410 and over the RIE mask layer 408. The smooth surface and the consistent microstructure of the second side gap layer 460 may be achieved by adjusting the angle "B" in relation to the angle "A".

As mentioned above, the angle "A" varies depending on the requirements of different processes. In one embodiment, the angle "A" is relatively large, such as 25 degrees or higher. When the angle "A" is relatively large, the surface of the second side gap layer 460 facing the opening 410 may be bumpy and the microstructure of the second side gap layer 460 is inconsistent inside the opening 410 and over the RIE mask layer 408. The bumpy surface makes bevel angle process control very difficult and may also impact magnetic properties of films subsequently grown thereon. It has been discovered that for a given angle "A", the angle "B" may be in a certain range when depositing the first side gap layer 440, causing the second side gap layer 460 subsequently deposited on the first side gap layer 440 to have a smooth surface facing the opening 410. In one embodiment, the angle "A" is about 25 degrees, and the angle "B" may be between 0 and 7 degrees, so the angle "A" is close to normal to the wafer surface. The ratio of the angle "A" to the angle "B" may range from about 250 to about 3.5. As a result, the first side gap layer 440 has a surface facing the opening 410 that is homogenous and the second side gap layer 460 deposited on the homogenous surface of the first side gap layer 440 may have a smooth surface facing the opening 410 and a consistent microstructure. In addition, the combined thickness of the first side gap layer 440 and the second side gap layer 460 inside the opening 410 and the combined thickness of the first side gap layer 440 and the second side gap layer 460 outside the opening 410 (i.e. over the RIE mask layer 408) are substantially equal. It should be noted that deposition from normal incidence should normally be avoided due to performance issues such as in-board and out-board coverage non-uniformity.

In one embodiment, the first side gap layer 440 is a seed layer and is made of a non-magnetic material, such as Ru. The seed layer may be deposited in the opening 410 by the IBD described above with reference to FIG. 4C. The angle "B" of the side walls 420 in the opening 410 is about 25 degrees or higher. Subsequently, the second side gap layer 460, made of the same non-magnetic material, partial epitaxially grows on the seed layer by ALCVD. As a result, the second side gap layer 460 deposited on the homogenous surface of the first side gap layer 440 may have a smooth surface facing the opening 410 and a consistent microstructure. In addition, the combined thickness of the first side gap layer 440 and the second side gap layer 460 inside the opening 410 and the combined thickness of the first side gap layer 440 and the second side gap layer 460 outside the opening 410 (i.e. over the RIE mask layer 408) are substantially equal.

Figure 5:
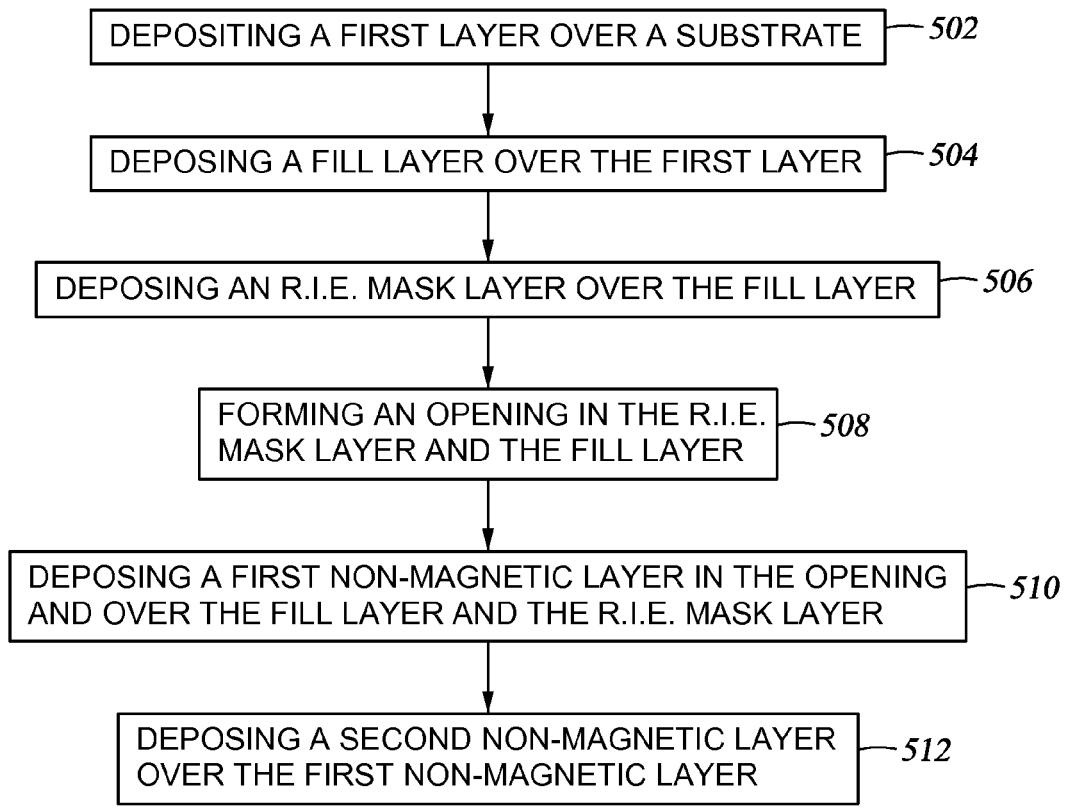
FIG. 5 is a flow diagram depicting a process for forming a magnetic write head according to one embodiment.

FIG. 5 is a flow diagram depicting a process for forming a magnetic write head according to one embodiment. At step 502, a first layer is deposited over a substrate. The first layer may be an RIE stop layer made of a material that is resistant to RIE, such as Ru, Rh, NiCr, or Cr. The first layer may be deposited by any deposition method known in the art, such as sputtering. At step 504, a fill layer is deposited over the first layer. The fill layer may be made with a material that is not resistant to RIE, such as alumina. The fill layer may be deposited by any deposition method known in the art, such as sputtering.

At step 506, an RIE mask layer is deposited over the fill layer and may be made of a material that is resistant to RIE, such as Ta, Cr, NiCr. The RIE mask layer may be deposited by any deposition method known in the art, such as sputtering. At step 508, an opening is formed in the RIE mask layer and the fill layer. The opening may be formed with any material removing method known in the art. In one embodiment, the opening in the RIE mask layer is formed by a first ion milling process, and the opening in the fill layer is formed by a second ion milling process. In another embodiment, the opening in both RIE mask and fill layers is formed by one or more RIEs. In either embodiment, the RIE or the ion milling process forms the opening in the fill layer with side walls having an angle with respect to vertical. The angle may be at least 25 degrees.

At step 510, a first non-magnetic layer, such as a Ru layer, is deposited in the opening and over the fill and the RIE mask layers. The non-magnetic layer may be a seed layer for epitaxial growth of a layer over the seed layer. The first non-magnetic layer is deposited by IBD, in which an ion beam is directed to the side walls of the opening to form the non-magnetic layer in the opening. The ion beam has an angle with respect to vertical. Such angle should be close to vertical to the wafer normal during deposition. In one embodiment, the angle of the side walls is about 25 degrees with respect to vertical and the angle of the ion beam ranges from about 0 degrees to about 7 degrees with respect to vertical.

At step 512, a second non-magnetic layer is deposited over the first non-magnetic layer. The second non-magnetic layer may be made of the same material as the first magnetic layer. In one embodiment, both non-magnetic layers are made of Ru. The second non-magnetic layer may be deposited by ALCVD. In one embodiment, the second non-magnetic layer partial epitaxially grows on the first non-magnetic layer using ALCVD.

In summary, by adjusting the angle of an ion beam directed to side walls of an opening based on the angle of the side walls during an IBD, a smooth gap of a damascene write pole is formed. The IBD forms a first gap seed layer in the opening, where the angle of the side walls of the opening and the ion beam is close to the side wall opening angle. A second gap layer deposited over the first layer may have a smooth surface facing the opening as the result of adjusting the angle of the ion beam during the IBD.

While the foregoing is directed to embodiments of the present invention, other and further embodiments of the invention may be devised without departing from the basic scope thereof, and the scope thereof is determined by the claims that follow.

What is claimed is:

1. A method for forming a magnetic write head, comprising:
    depositing a first layer of material over a substrate;
    depositing a fill layer over the first layer;
    forming an opening in the fill layer, wherein the opening is bound by a side wall having a first angle with respect to vertical;
    depositing a seed layer on the fill layer within the opening using ion beam deposition, wherein the ion beam deposition comprises delivering an ion beam at the side wall at a second angle with respect to vertical, wherein the first angle and the second angle have a ratio ranging from about 250 to about 3.5; and
    partially epitaxial growing a non-magnetic layer on the seed layer using atomic layer chemical vapor deposition.

2. The method of claim 1, wherein the fill layer comprises alumina.

3. The method of claim 2, wherein the seed layer and the non-magnetic layer comprise ruthenium.

4. The method of claim 3, wherein the first angle is about 25 degrees.

5. A method for forming a magnetic write head, comprising:
    depositing a first layer of material over a substrate;
    depositing a fill layer over the first layer;
    depositing an RIE mask layer over the fill layer;
    forming an opening in the RIE mask layer and the fill layer wherein the opening is bound by a side wall having a first angle with respect to vertical;
    depositing a first non-magnetic layer on the fill layer within the opening and over the RIE mask layer using ion beam deposition, wherein the ion beam deposition comprises delivering an ion beam at the side wall at a second angle with respect to vertical, wherein the first angle is between about 18 and about 30 degrees, and wherein the first angle and the second angle have a ratio ranging from about 250 to about 3.5 ;and
    depositing a second non-magnetic layer on the first non-magnetic layer, wherein the first and the second non-magnetic layers have a first total thickness along the side wall in the opening of the fill layer and a second total thickness over the RIE mask layer, and the first total thickness and the second total thickness are within ±5% of each other.

6. The method of claim 5, wherein the first angle is about 25 degrees.

7. The method of claim 5, wherein the fill layer comprises alumina.

8. The method of claim 7, wherein the depositing the second non-magnetic layer comprises depositing the second non-magnetic layer using atomic layer chemical vapor deposition.

* * * * *